United States Patent [19]

Martin

[11] Patent Number: 4,602,403

[45] Date of Patent: Jul. 29, 1986

[54] POULTRY PROCESSING METHOD AND APPARATUS WITH MULTI-PURPOSE SHACKLE

[75] Inventor: Eugene G. Martin, New Holland, Pa.

[73] Assignee: Favorite Manufacturing, Inc., New Holland, Pa.

[21] Appl. No.: 570,916

[22] Filed: Jan. 16, 1984

[51] Int. Cl.$^4$ .............................................. A22C 25/16
[52] U.S. Cl. .......................................... 17/46; 17/11; 17/24; 17/44.1
[58] Field of Search ................... 17/1 G, 11, 44.1, 46, 17/24

[56] References Cited

U.S. PATENT DOCUMENTS

| 671,900 | 4/1901 | Stanert | 17/44.1 |
| 2,830,319 | 4/1958 | Muntz | 17/46 |
| 3,347,680 | 10/1967 | Rambold | 17/46 |
| 4,016,624 | 4/1977 | Martin et al. | 17/52 |
| 4,351,087 | 9/1982 | Altenpohl et al. | 17/44.1 |
| 4,385,421 | 5/1983 | Martin | 17/52 |

FOREIGN PATENT DOCUMENTS 326942 3/1972 U.S.S.R. .

OTHER PUBLICATIONS

"Altenpohl Automatic Sizer" Author=Altenpohl 8/22/63.
Catalog sheet entitled "Simon Johnson—Turkey Boning System".
Catalog sheet entitled "Gordon Johnson—Further Processing".
Reprint from the Agricultural Research publication of Jun. 1969.
Catalog publication entitled "Pritchard Auto-Cone Breast Deboning Systems".

Primary Examiner—Lowell A. Larson
Assistant Examiner—Robert Showalter
Attorney, Agent, or Firm—Price, Heneveld, Huizenga & Cooper

[57] ABSTRACT

An apparatus for use in deboning eviscerated, dressed poultry carcasses includes an overhead conveyor from which a plurality of deboning shackle assemblies are suspended. Each deboning shackle assembly includes a shackle bar supporting a holding cone and a hock shackle. The cone and shackle are positioned on opposite sides of a processing line defined by the conveyor. An endless conveyor is positioned beneath the overhead conveyor to receive poultry parts removed from carcasses suspended on the shackle assembly. A leg processing machine may be positioned along the line to receive carcass hindquarters.

25 Claims, 8 Drawing Figures

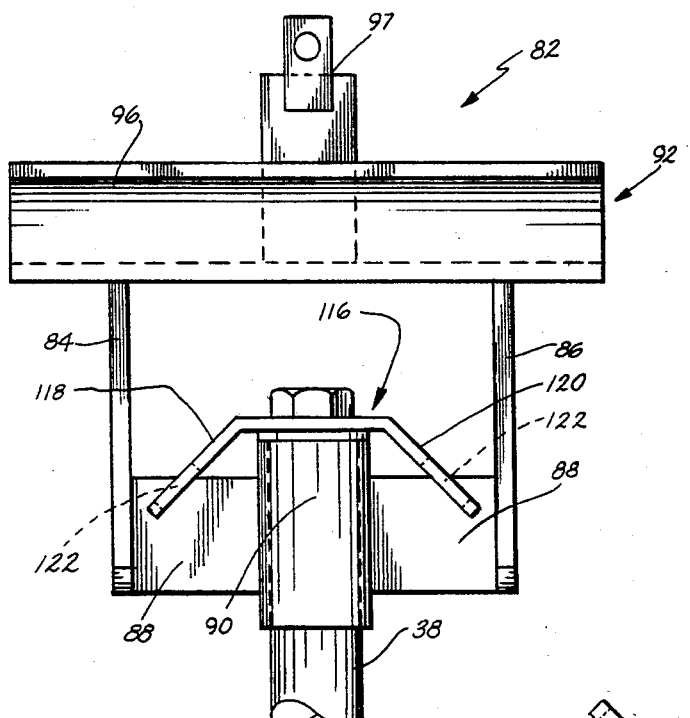
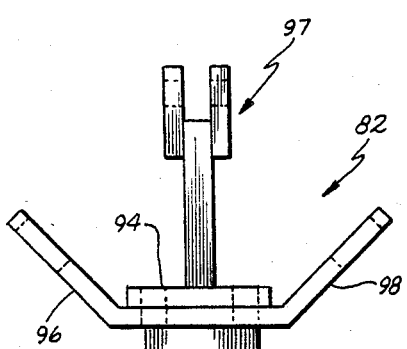
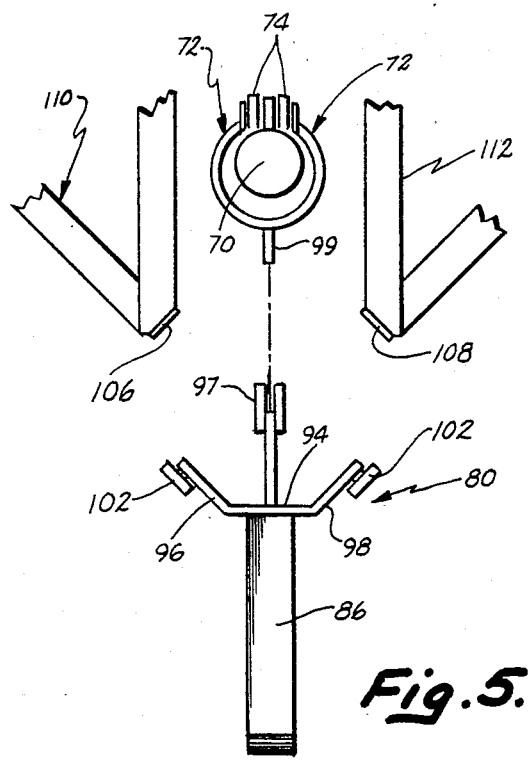

POULTRY PROCESSING METHOD AND APPARATUS WITH MULTI-PURPOSE SHACKLE

BACKGROUND OF THE INVENTION

The present invention relates to a method and apparatus for deboning poultry carcasses and particularly to a unique method and apparatus for removing meat from the carcass along a processing line and which permits ready incorporation of poultry cut-up machines into the line.

In the processing of poultry such as chickens, turkeys and the like, the birds are initially killed, defeathered and eviscerated. After the eviscerating step, the poultry carcasses are then cut up or dismembered into component parts. Such cut-up operations involve removal of the meat components from the carcass. Generally, cut-up or deboning operations are performed by hand. Fairly recently, automated machinery or poultry cut-up machines have been developed to perform at least some of the deboning steps to increase production rates.

In a typical hand debonig operation, the eviscerated poultry carcasses are hung by their hocks from rigid shackles. The shackles are suspended from an overhead trolley type conveyor. The plant workers or operators are stationed along the conveyor line and manually cut off the wings, the breast meat, and the legs from the poultry carcass. As the birds progress down the processing line, the operators perform the different cuts and removal operations. Generally, all of the operators or workers are stationed along one side of the poultry processing line. The shackles may swing or rotate or the birds may be rotated thereon to permit access to all sides of the carcass. In final cut-up operations, the backbone may be removed and the drumsticks and thigh may be separated from the hindquarter or lower saddle of the carcass.

In addition, deboning operations may be performed on a truncated cone type holder. Generally, the cone is supported on a moving conveyor. The cone is inserted into the body cavity of the carcass. As the cone is moved along the processing line, workers on one side of the line remove meat from the carcass. The removed portions are deposited on a belt conveyor running adjacent the cone conveyor. An example of a hand processing arrangement employing a cone holder may be found in U.S. Pat. No. 4,385,419 entitled CHICKEN DEBONING APPARATUS AND METHOD and issued on May 31, 1983 to George T. Cantrell.

In order to increase production rates, various forms of automatic cut-up machines have been developed for use in the processing industry. An example of one such machine may be found in U.S. Pat. No. 4,385,421 entitled POULTRY LEG/BACK PROCESSOR and issued on May 31, 1983 to Eugene G. Martin. With this machine, a poultry carcass lower saddle is placed on a conveyor. The machine automatically separates the poultry leg sections from the back of the carcass. An example of another cut-up machine which operates on the entire carcass may be found in U.S. Pat. No. 4,016,624 entitled POULTRY CUT-UP MACHINE and issued on Apr. 12, 1977 to Eugene G. Martin et al.

Prior processing lines have not readily integrated automatic cut-up machines. Also, production rates have been limited by available plant floor space. As a result, a need exists for an apparatus and method which will significantly increase production capacity for a given plant floor space, which permits efficient deboning and which readily incorporates cut-up machines into the operation.

SUMMARY OF THE INVENTION

In accordance with the present invention, the aforementioned needs are substantially fulfilled. Essentially, the invention includes a deboning shackle assembly which may be suspended or secured to a conveyor for cut-up operations. The shackle assembly includes a shackle bar which supports a holding cone on one side and a hock shackle on the opposite side thereof. The deboning shackle assembly permits cut-up operations to be performed by workers from both sides of the processing line.

In narrower aspects of the invention, the shackle assembly is suspended from and rigidly secured to an overhead conveyor. The conveyor preferably runs along a closed loop path and defines a carcass hanging zone or run, a breast separation zone or run, a breast deboning zone or run and a lower saddle hindquarter transfer zone or run. Also in the preferred form, endless conveyors are positioned beneath the overhead conveyor to receive meat product and to assist with transferring the breast portion or forward, bilateral section of the carcass from one side of the processing line to the opposite side at which it is mounted on a cone holder. After the breast portion of the carcass is removed from the lower saddle, the lower saddle may then be removed from the hock carrier and transferred to a leg/-back processing or cut-up machine.

The apparatus and method in accordance with the present invention maximizes production rates for available floor space. Cut-up and deboning operations are accomplished on both sides of the processing line. This significantly decreases the floor space required and in effect may double capacity for a given space. Also, the apparatus permits ready incorporation of poultry cut-up equipment into the line.

BRIEF DESCRIPTION OF THE DRAWINGS

FIG. 5 is an exploded, elevational view showing portions of the overhead trolley conveyor;

FIG. 6 is a side, elevational view of the shackle trolley subassembly;

FIG. 8 is an end, elevational view of the structure of FIG. 6.

DETAILED DESCRIPTION OF THE PREFERRED EMBODIMENT

Figure 1:
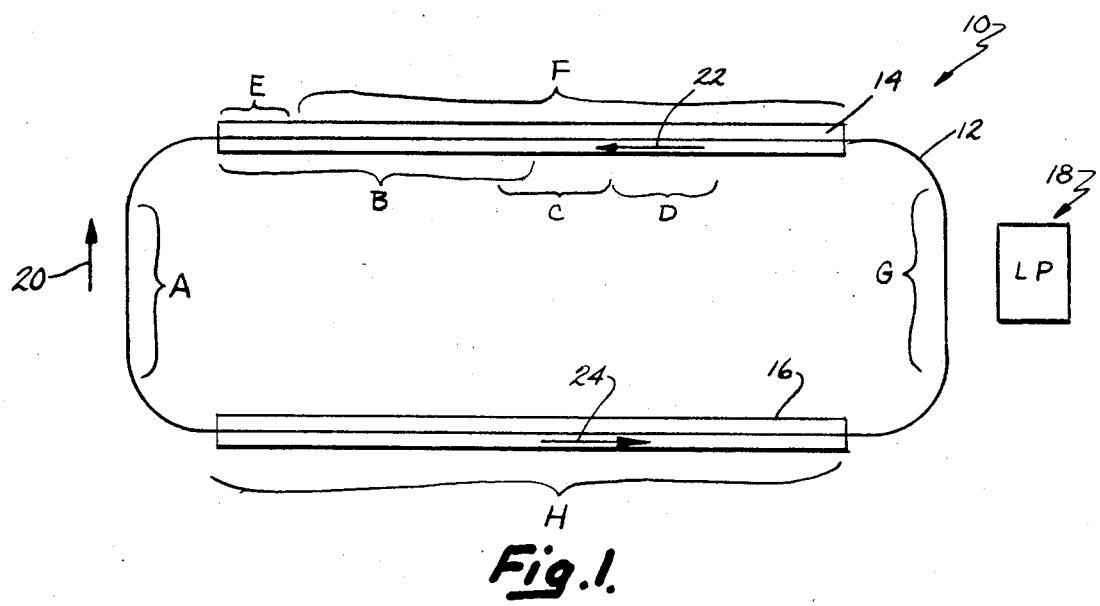
FIG. 1 is a schematic, plan view of a poultry processing line in accordance with the present invention.

A poultry deboning line in accordance with the present invention is schematically illustrated in FIG. 1 and generally designated 10. Line 10 includes a closed loop, elongated overhead conveyor 12, two endless belt conveyors 14, 16 positioned adjacent or below the overhead conveyor 12 and a leg processing machine 18. Processing machine 18 is preferably of the type illustrated in U.S. Pat. No. 4,385,421, the disclosure of which is hereby incorporated by reference.

Figure 2:
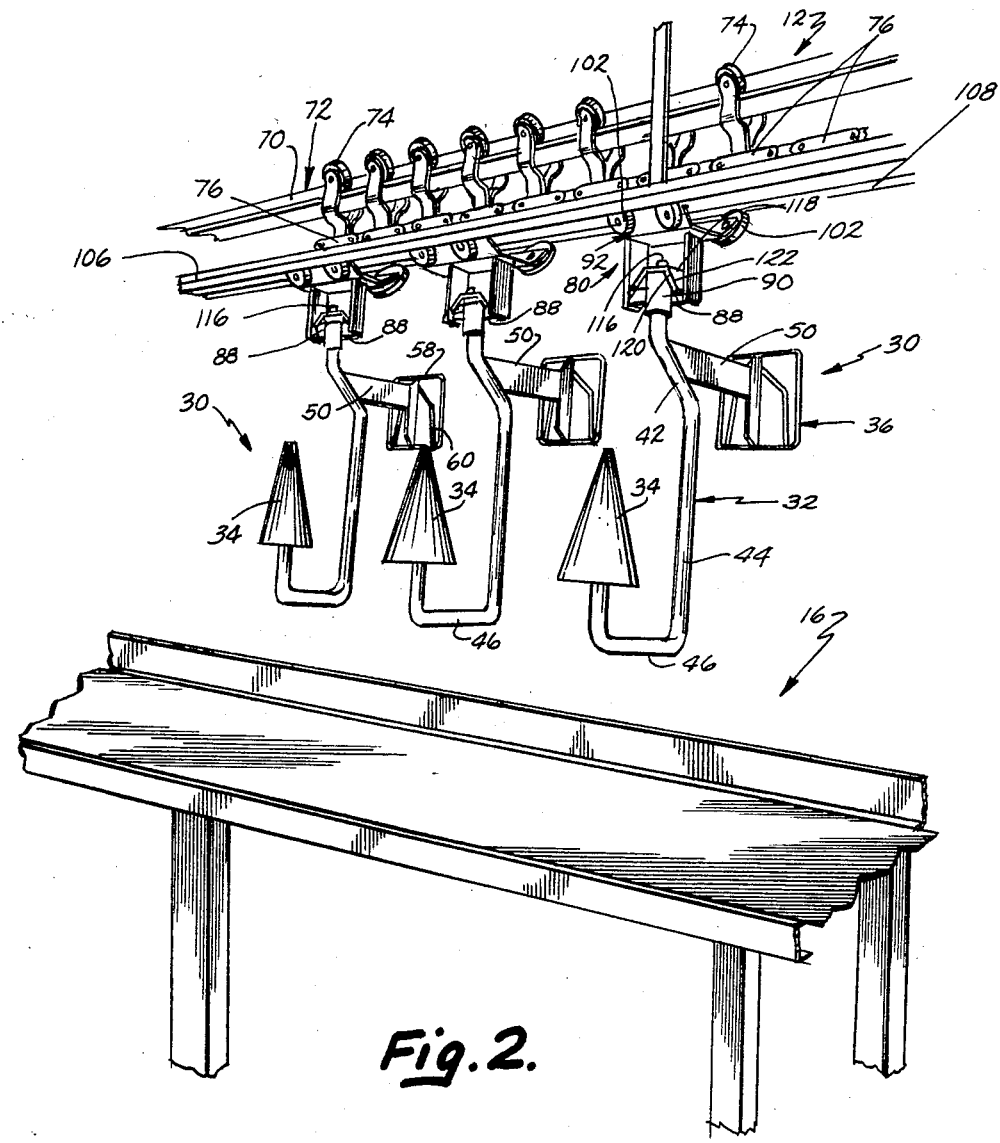
FIG. 2 is a fragmentary, perspective view of a portion of the line showing the overhead conveyor structure, the shackle assembly, and the belt conveyor.
Figure 4:
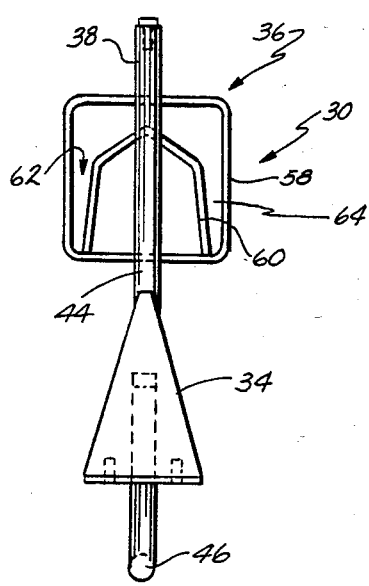
FIG. 4 is a side, elevational view of a shackle assembly in accordance with the present invention.
Figure 3:
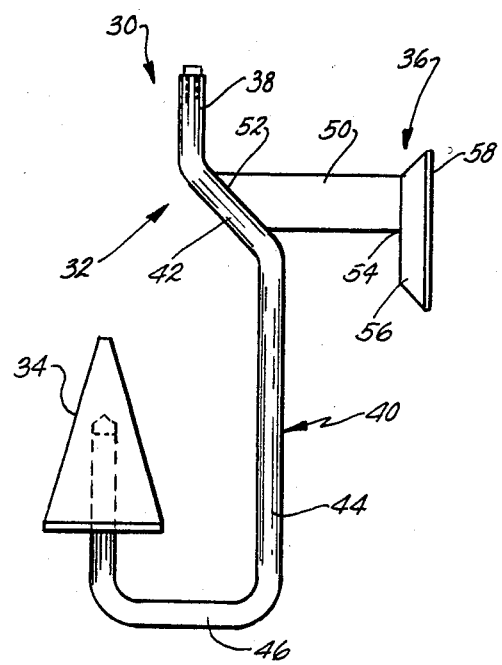
FIG. 3 is a front, elevational view of a shackle assembly in accordance with the present invention.
Figure 7:
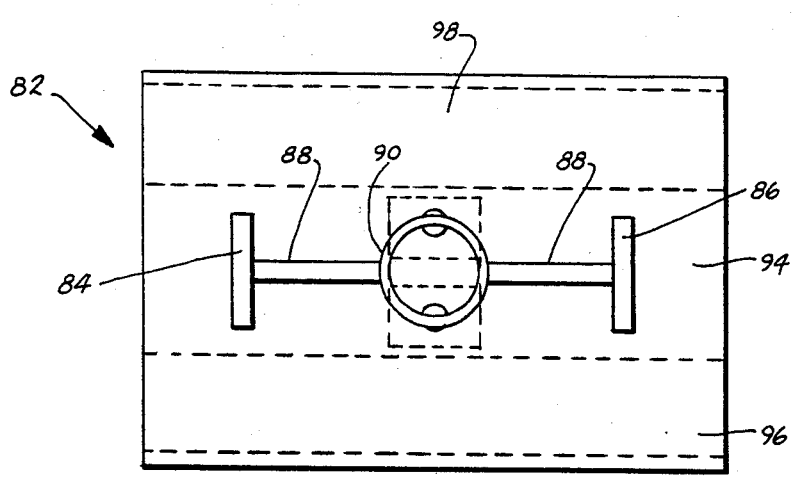
FIG. 7 is a bottom, plan view of the structure of FIG. 6.

As shown in FIG. 1, overhead conveyor 12 continuously moves in the direction designated by arrow 20. Belt conveyor 14 moves in the direction designated by arrow 22 or opposite to the direction of the conveyor. Belt conveyor 16 moves in the direction designated by arrow 24. Conveyors 14, 16 are conventional. As discussed in detail below, suspended on conveyor 12 are a plurality of deboning shackle assemblies 30 (FIG. 2). The shackle assemblies permit cut-up operations to be performed on both sides of the overhead trolley conveyor 12. The system, also as described in more detail below, is divided essentially into a plurality of zones. Zone A is the area or run at which poultry carcasses are hung on the overhead conveyor from their hocks. Along zones B, C and D, cut-up operations are performed by workers positioned along the line and the breast portion or forward bilateral carcass section of the bird is separated from the hindquarters or rear saddle of the carcass. The breast portion is then trasnferred to a zone E on conveyor 14. At zone E, the breast portion is rehung on the conveyor. Along zones F and H, breast deboning operations are conducted. At zone G, the rear saddle of each carcass is removed from the inside of conveyor 12 and fed into leg processing machine 18.

The overhead conveyor 12 and shackle assembly 30 are best seen in FIGS. 2, 3, 4 and 5. As shown therein, conveyor 12 supports a plurality of shackle assemblies 30. Each shackle assembly includes an elongated support bar 32, a cone holder 34 and a hock shackle or hock carrier 36. Support bar 32 in the preferred form has a generally hook shaped configuration including an upper trolley attachment portion 38, an offset shank portion 40 having an angled intermediate portion 42 and an elongated portion 44, and a lower end portion or free portion 46. Shank 40 is, therefore, generally L-shaped or hook-shaped in configuration. The free end of portion 46 is upturned and supports truncated cone holder 34. Cone holder 34, as explained in more detail below, is adapted to be inserted into the inner body cavity of the breast portion of the carcass. Cone 34 positions the breast portion so that workers along the processing line may manually carve meat from the carcass.

Hock shackle or carrier 36 includes an elongated support plate 50 having an end 52 welded or otherwise suitably secured to portion 42 of the support bar. At end 54 of support plate 50, a vertical support plate 56 is secured. Secured to plate 56 is a hock shackle including an outer, generally rectangular wire loop or frame 58 and an inner, generally V-shaped frame or member 60. Frame 58 and frame 60 are welded or otherwise suitably secured to support plate 56. Frames 58, 60 define generally V-shaped spaces 62, 64. The hocks of the carcass are disposed and retained within such spaces 62, 64 in a conventional fashion. Shank 40 of the shackle assembly is offset through the angled intermediate portion 42 to position cone holder 34 and hock carrier 36 on opposite sides of the processing line. The offset of the support bar also more closely balances the weight of the carcass portions positioned on the cone holder and the hock carrier or shackle. In the preferred form, and as shown in FIG. 2, the shackle assembly is suspended on the overhead conveyor with the cone holder 34 around the outside perimeter of the line and the hock carrier along the inside perimeter of the line.

The deboning shackle assembly 30 is suspended from the overhead conveyor 12 in a relatively rigid fashion. In order to present carcass portions to the workers and permit deboning operations to be carried on from both sides of the line, it is desirable to restrict swinging, rotational and/or vertical movement of the shackle subassembly. As seen in FIGS. 2 and 5, the overhead trolley 12 includes a track 70, wheeled trolley hangers 72 having wheels 74 riding on the track and an overhead conveyor chain 76 interconnecting each of the trolley hangers. This is a standard trolley configuration.

In order to stabilize the deboning shackle subassembly, such is connected to the trolley hangers through a shackle carrier or trolley subassembly generally designated 80. Subassembly 80 includes a frame or weldment 82 having plate ends 84 and 86 joined by cross plates 88. A cylindrical support tube 90 is secured between cross plates 88. The upper ends of plates 84, 86 are secured to an elongated wing-like plate 92. Plate 92 includes an elongated, rectangular base 94 and angled wings 96, 98. Wings 96, 98 extend outwardly and upwardly from the lateral edges of plate portion 94. A bracket 97 is mounted centrally on base 94. Bracket 97 is secured to a bracket 99 of the trolley hanger by a suitable fastener.

A plurality of trolley wheels 102 are rotatably mounted by suitable axles adjacent the free lateral edges of wing portions 96 and 98 of member 92. As best seen in FIGS. 2 and 5, wheels 102 ride on and engage trolley stabilizer tracks 106, 108. Tracks 106, 108 are supported by suitable frame members 110, 112 along both sides of the overhead conveyor track. Tracks 106, 108 are elongated members which extend along the breast deboning runs F and H. Each shackle assembly is supported from cylindrical member 90 of the subassembly 80. Trolley attachment portion 38 is disposed within cylinder 90 and an attachment plate 116 (FIG. 6) is secured to the top of portion 38. Attachment plate 116 has a generally flattened U configuration in side elevation. Legs 118, 120 of plate 116 are formed with slots 122. Slots 122 receive the connecting plates 88 of subassembly 80. Plate 116 mounts shackle 30 to the carrier or trolley subassembly in a rigid, nonrotational manner.

When suspended from the shackle trolley subassembly, cone holder 34 and hock carrier 36 lie in a plane perpendicular to the longitudinal axis of overhead trolley track 70 or the direction of travel of the overhead trolley conveyor. In other words, the cone and hock carrier extend outwardly from the support bar on opposite sides of the conveyor and hence of the processing line.

OPERATION

In the preferred form, the overhead trolley conveyor is arranged in a closed loop in the general form of a rectangle. Along zone or run A, an operator will hang the poultry carcass from its hocks in one of the hock carriers 36 of the shackle subassemblies. The carcasses are then conveyed past workers in zones B, C and D for initial cut-up operations. The workers in zone B will cut along the leg and thigh of the carcass and the belly skin and tissue of the carcass to the vertebrae of the breast portion. At zone C, the workers will break back the breast portion from the lower saddle or hindquarters of the carcass. Along zone D, the workers cut the skin and separate the breast portion of the carcass from the hindquarters. The hindquarters will then continue to be conveyed by conveyor 12 in the direction of arrow 20 toward zone G.

Upon separation of the breast portion from the hindquarters, the breast portion is deposited on belt conveyor 14. Belt conveyor 14 conveys the breast portions in the direction of arrow 22 to zone E which is adjacent the start of zone B but on the opposite side of the processing line. At zone E, a worker will rehang the breast portion on the conveyor by placing the inner body cavity over the cone holder 34. As the breast portion on the cone holder traverses zone or run F of the processing line, breast deboning operations are performed by the workers.

As the shackle assemblies traverse zone G, a worker on the inside of the processing line removes each of the hindquarters from hock carriers 36. The worker then feeds the hindquarters into a leg/back processing unit 18. In the preferred form, zone G or run G of conveyor 12 is located at an elevated position from the floor of the facility, and processor 18 is supported on a platform. Trolley 12 moves vertically along upwardly angled portions of the conveyor run. This permits ready worker access to the interior of the processing line.

The shackle assemblies continue along the conveyor line 12 and are conveyed to zone H. The final deboning operations are performed within zone H. Meat removed from the carcass along the processing line may be deposited on the endless conveyors. At the end of zone H, the carcass is removed from the cone.

The shackle assemblies 36 are held in a relatively rigid fashion along zones F and H by the shackle carriers and stabilizer tracks. The carcasses are, therefore, presented to the workers for ready removal of the meat from the carcass and separation of the breast portion from the lower saddle of the carcass. By running conveyor 14 in a direction opposite to the direction of the overhead conveyor 12, the overall length of the processing line may be reduced. This has the effect of increasing production rates for a given floor space and/or permitting the conveyor to operate at an increased rate. The shackle subassembly including the cone holders permits the workers to debone using a wing tear method. The carcass is held firmly by the cone and the wings may be used as handles to get a hold of the meat. The operator tends to tear the meat away from the bone in some areas rather than cutting it away. This allows the operator to get a lot closer to the carcass bone and remove the maximum amount of meat.

The apparatus permits the ready incorporation of the leg processing unit into the overall processing line. The hindquarters may be removed from the hock carriers or shackles along a short side of the rectangular closed loop conveyor. No additional transfer operations are necessary, and the hindquarters are fed directly into the leg processor. The system also provides increased versatility to the poultry processor. The workers may section or cut the poultry either into a whole breast with or without skin, a deboned breast with or without skin, whole drums and thighs and/or deboned drums and thighs. The overall system permits ready grading and classification of the component parts of the poultry. Further packaging equipment or further processing machines may be positioned immediately adjacent discharge ends of the endless conveyors.

The shackle subassembly and related apparatus permit efficient cutting operations from both sides of the processing line and, in effect, may double production capacity from that heretofore obtained when the workers worked on only a single side of the line for a given floor space. The shackle subassembly permits independent operations from both sides of the processing line.

In view of the foregoing description, various modifications to the apparatus and method in accordance with the present invention will undoubtedly become apparent to those of ordinary skill in the poultry processing art. For example, the specific configuration of the support bar of the shackle subassembly and the configuration of the cone holder and hock carrier could be varied. The belt conveyor 14 could be set to run in the same direction as the overhead conveyor 20. This would merely necessitate an increase in the length of the processing line. Such would not make maximum use of available floor space, however. The direction of travel of conveyor 16 also is not critical. A processing operation could eliminate conveyor 16 and use bins, carts or several conveyors perpendicular to the overhead conveyor to move different types of carcass pieces to packaging stations. Different and conventional hock carriers could be incorporated in the shackle, and a conventional mechanical/automatic shackle unloader could be positioned along zone G. Therefore, it is expressly intended that the above description should be considered as only that of the preferred embodiment. The true spirit and scope of the present invention may be determined by reference to the appended claims.

The embodiments of the invention in which an exclusive property or privilege is claimed are defined as follows:

1. Apparatus for deboning poultry such as turkeys and chickens, said apparatus comprising:
   a deboning conveyor;
   a first processing line and a second processing line disposed on opposite sides of said deboning conveyor, said first and second processing lines extending in parallel directions for sequentially carrying out disparate poultry cutting operations;
   a plurality of poultry shackle assemblies operatively mounted on said conveyor for providing simultaneous cutting operations from both of said first and second opposed processing lines, each of said shackle assemblies comprising:
   a support including an elongated shank, said support having a conveyor attachment end;
   a cone holder secured to said support;
   a hock carrier secured to said support and extending therefrom opposite to said cone holder, said cone holder and said hock carrier lying generally in the same vertical plane so that when said support is attached to said conveyor, said hock carrier and said cone holder are disposed on opposite sides of said conveyor and define said first and second processing lines, respectively; and a transfer conveyor means positioned adjacent said deboning conveyor, said transfer conveyor means operating in a counterflow direction for transporting parts of the poultry from the end of the first processing line to the beginning of the second processing line.

2. Apparatus for deboning poultry as defined by claim 1 further including:
   an attachment bracket secured to said conveyor attachment end.

3. Apparatus for deboning poultry as defined by claim 2 wherein said attachment bracket includes a base portion and a pair of outwardly extending, angled leg portions joined to said base portion.

4. Apparatus for deboning poultry as defined by claim 1 wherein said support shank is offset from said conveyor attachment end and includes a lower leg portion.

5. Apparatus for deboning poultry as defined by claim 4 wherein said cone holder is secured to said lower leg portion.

6. Apparatus for deboning poultry as defined by claim 1 wherein said hock carrier includes:
   an elongated plate having an end secured to said support;
   an outer wire frame; and
   an inner wire frame, said frames carried by said plate and defining spaced openings for receiving the hocks.

7. Apparatus for deboning poultry such as turkeys and chickens, said apparatus comprising:
   a deboning conveyor;
   a first processing line and a second processing line disposed on opposite sides of said deboning conveyor, said first and second processing lines extending in parallel directions for sequentially carrying out disparate poultry deboning operations;
   a plurality of holding cones;
   a plurality of hock carriers;
   a plurality of securement means operatively connected to said conveyor for securing said hock carriers along one side of said conveyor to define said first processing line and securing said holding cones along a second side of said conveyor opposite said carriers to define said second processing line, whereby poultry is sequentially hung by the hocks on said hock carriers and cut to separate the breast from the hindquarters in said first processing line and the breast is rehung on said holding cones for deboning in said second processing line, each of said securement means including an elongated support bar having an end rigidly secured to said conveyor; and a transfer conveyor means positioned adjacent said deboning conveyor, said transfer conveyor means operating in a conterflow direction for transporting parts of the poultry from the end of the first processing line to the beginning of the second processing line.

8. Apparatus as defined by claim 7 wherein said deboning conveyor is a closed loop overhead trolley conveyor including an overhead track and a plurality of trolley hangers engaging said track.

9. Apparatus as defined by claim 7 wherein each of said securement means supports one of said holding cones and one of said hock carriers and wherein said securement means comprises:
   an elongated generally L-shaped support bar, said support bar having an upper end and a free end; and
   trolley means carrying said support bar for rigidly connecting said upper end to said conveyor so that said bar lies in a plane generally perpendicular to the direction of travel of said conveyor.

10. Apparatus as defined by claim 9 wherein one of said holding cones is mounted on said free end of said support bar and one of said hock carriers is mounted on said support bar between said upper end and said free end.

11. Apparatus as defined by claim 10 further including a trolley stabilizer rail extending along sides of said deboning conveyor and wherein said trolley means comprises:
   a trolley wheel carrier, said support bar being secured to said carrier; and
   at least a pair of trolley wheels rotatably supported on said carrier and engaging said trolley stabilizer rails.

12. Apparatus as defined by claim 11 wherein said deboning conveyor is a closed loop overhead trolley conveyor sequentially defining a poultry loading zone and a breast and hindquarter separation zone comprising said first processing line on one side of said conveyor; and a breast deboning zone comprising said second processing line along the other side of said conveyor.

13. Apparatus as defined by claim 7 wherein said transfer conveyor means is
   a counterflow belt conveyor positioned adjacent said deboning conveyor for transporting parts of the poultry from the end of said first processing line to the beginning of said second processing line.

14. Apparatus as defined by claim 7 wherein said deboning conveyor is a closed loop overhead trolley conveyor sequentially defining a poultry loading zone and a breast and hindquarter separation zone comprising said first processing line on one side of said conveyor; and a breast deboning zone comprising said second processing line along the other side of said conveyor.

15. Appraatus as defined by claim 14 wherein said transfer conveyor means is
   another conveyor positioned below said overhead trolley conveyor and along said breast and hindquarter separation zone.

16. Apparatus as defined by claim 15 wherein said another conveyor is an endless belt conveyor which travels in a direction opposite to the direction of travel of said overhead trolley conveyor for transporting parts of the poultry from the end of said first processing line to the beginning of said second processing line.

17. Apparatus as defined by claim 14 wherein said overhead trolley conveyor further defines a hindquarter transfer zone at the end of said first processing line within which a worker may remove the hindquarters from the hock carrier and transfer same to a leg processing machine.

18. Apparatus as defined by claim 17 wherein said transfer conveyor means is
   another conveyor positioned below said overhead trolley conveyor and along said breast and hindquarter separation zone.

19. Apparatus as defined by claim 18 wherein said another conveyor is an endless belt conveyor which travels in a direction opposite to the direction of travel of said overhead trolley conveyor for transporting parts of the poultry from the end of said first processing line to the beginning of said second processing line.

20. A method of deboning poultry carcasses comprising the steps of:
   providing an elongated conveyor having a loading run and a breast and hindquarter separation run comprising a first processing line disposed along one side of the conveyor, and a breast deboning run comprising a second processing line disposed along an opposite side of the conveyor, said first and second processing lines extending in parallel directions for sequentially carrying out disparate poultry cutting operations, said conveyor including a plurality of hock carriers disposed along said breast and hindquarter separation run and a plurality of breast supports oppositely disposed along said breast deboning run;

hanging poultry carcasses from their hocks on said conveyor at said loading run in the beginning of said first processing line;

cutting each of said carcasses to separate the carcass into a breast portion and hindquarters during said separation run in said first processing line;

transferring the breast portion of each carcass to the breast deboning run between said first and second processing lines;

hanging the breast portion of each carcass on the conveyor at the beginning of said second processing line; and deboning the breast portion of the carcass to remove the meat therefrom in said second processing line.

21. A method as defined by claim 26 wherein said step of hanging poultry carcasses from their hocks positions the carcass with the breast facing an operator to position the carcass for cutting.

22. A method as defined by claim 21 wherein said step of cutting said carcass to separate the breast portion therefrom includes the steps of:

cutting between the legs of the carcass;
cutting the skin and tissue of the carcass to the breast;
breaking the breast back from the hindquarters;
cutting the skin; and
separating the breast portion from the hindquarters.

23. A method as defined by claim 21 wherein said transferring step includes the step of conveying the breast portion in a direction opposite the direction of travel of the hindquarters portion prior to hanging the breast portion on the conveyor to reduce the overall length of the conveyor.

24. A method as defined by claim 23 wherein said step of cutting said carcass to separate the breast portion therefrom includes the steps of:

cutting between the legs of the carcass;
cutting the skin and tissue of the carcass to the breast;
breaking the breast back from the hindquarters;
cutting the skin; and
separating the breast portion from the hindquarters.

25. A method of deboning a poultry carcass along first and second parallel and sequential processing lines, comprising the steps of:

providing a plurality of shackle assemblies, each shackle assembly including a hock shackle on one side thereof for defining said first processing line and a holding cone on the opposite side thereof for defining said second processing line;

hanging a poultry carcass from its hocks on the rigid shackle of one of said shackle assemblies at the beginning of said first processing line;

conveying said shackle assemblies along a closed loop with the poultry carcass disposed along one side of the loop;

separating the breast portion of the poultry carcass from the rear saddle of the carcass in said first processing line;

transferring the breast portion of the poultry carcass in a direction counterflow to the closed loop from the end of said first processing line to the begininng of said second processing line;

hanging the breast portion of the poultry carcass on the holding cone of another of said shackle assemblies at the beginning of said second processing line;

deboning the breast portion of the poultry carcass on said holding cone in said second processing line;

transferring the rear saddle to a leg processing machine at the end of said first processing line; and removing the breast portion of the carcass from the holding cone after deboning in said second processing line.

* * * * *